Dec. 14, 1954   S. M. HARMON ET AL   2,696,954
AUTOMATIC DIFFERENTIAL FLAP OPERATING DEVICE FOR IMPROVING
STABILITY AND CONTROL CHARACTERISTICS OF AIRCRAFT
Filed Feb. 6, 1950
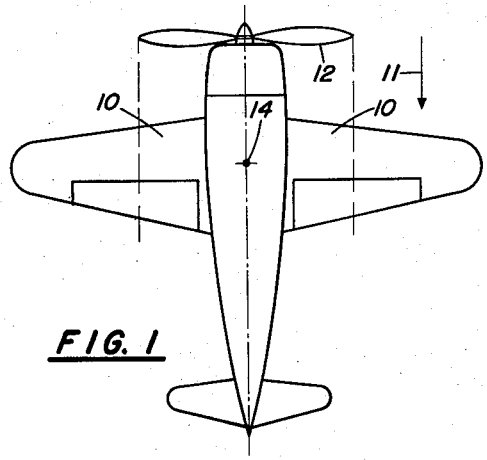
FIG. 1
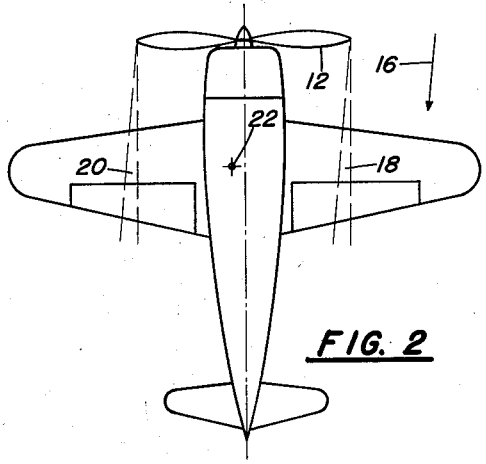
FIG. 2
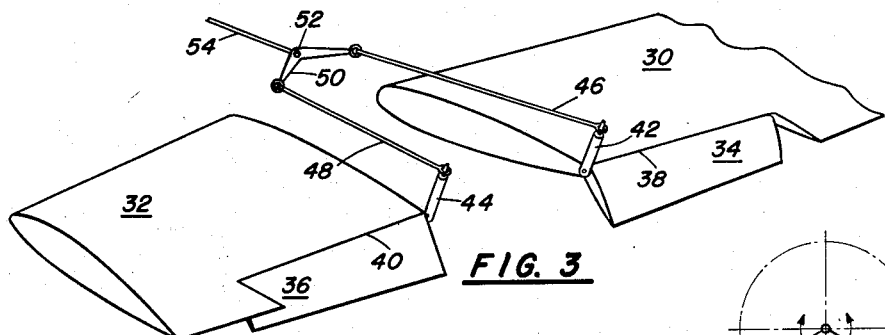
FIG. 3
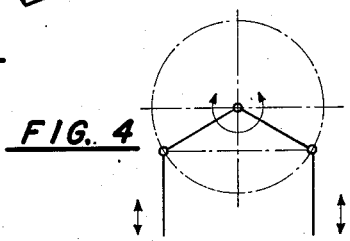
FIG. 4
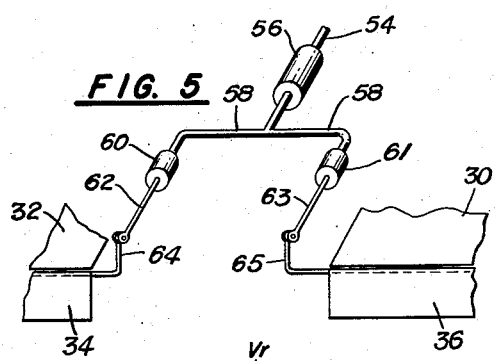
FIG. 5
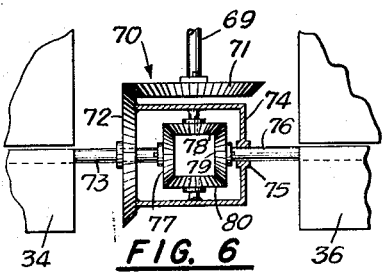
FIG. 6
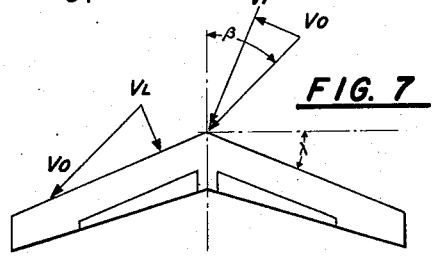
FIG. 7
Inventors
HERBERT S. RIBNER
SIDNEY M. HARMON
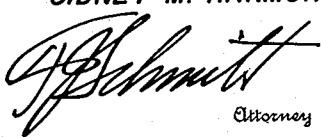
Attorney

United States Patent Office 2,696,954
Patented Dec. 14, 1954

2,696,954

AUTOMATIC DIFFERENTIAL FLAP OPERATING DEVICE FOR IMPROVING STABILITY AND CONTROL CHARACTERISTICS OF AIRCRAFT

Sidney Morris Harmon, Hampton, Va., and Herbert Spencer Ribner, Cleveland Heights, Ohio Application February 6, 1950, Serial No. 142,684

5 Claims. (Cl. 244—42)

(Granted under Title 35, U. S. Code (1952), sec. 266)

This invention relates to means for improving various stability and control characteristics of aircraft by means of an automatic differential flaps device. It is adaptable to automatically provide relief for flaps down loss in effective dihedral due to power, if the plane is propeller driven, is adaptable to provide improved lateral stability and control characteristics for highly sweptback or sweptforward wings and to increase lateral control by compensating for the loss in lateral control due to induced angles at the tail resulting from aileron deflections on the wings.

It is known that the application of power in tractor airplanes generally causes a large decrease in the effective dihedral of such airplanes, particularly at low speeds; that for airplanes possessing initially small positive values of effective dihedral in gliding flight, power application may lower the effective dihedral to negative values and induce large and unsatisfactory degrees of spiral divergence. These adverse effects cannot be simply eliminated by the expediency of increasing the initial amount of geometrical dihedral because such a change may provide an excessive amount of dihedral with power off and lead to poor or unstable oscillatory characteristics in power-off flight or in power-on flight at high speeds.

This loss in effective dihedral due to power is due to a lateral shifting of the center of pressure of the lift from the "X" axis of the plane caused by a lateral displacement of the slipstream. This laterally displaced center of pressure exerts a rolling moment about the center of gravity thereby producing a yawing from the line of flight and a consequent decrease in the effectiveness of lateral control. Not only are powered planes having the leading edges of the wings substantially normal to the "X" axis subject to this loss of effective dihedral, but also those planes in which the wings are swept back or forward are subject thereto.

It is therefore an object of the invention to provide means of compensating for or counteracting this loss of effective dihedral in flaps down flight of the various types of powered planes above enumerated.

It is also an object of the invention to accomplish this compensation by means of a device which automatically responds to the conditions of flaps down yawed flight by differential adjustment of the flaps to set up moments which oppose the rolling moment above referred to.

It is also an object of the invention to reduce or eliminate entirely the excessive positive dihedral effect caused by the deflection of flaps in sweptback wings.

It is a further object of the invention to provide a device which increases the lateral control and compensates for loss in lateral control of an aircraft due to induced angles at the tail resulting from aileron deflections on the wings thereof.

Other objectives will be apparent from the following description and from the drawings herewith submitted which are partly explanatory of the underlying theory of operation and partly illustrative of a preferred embodiment of the invention and in which, Figure 1 is a diagrammatic sketch showing in plan view the balanced or even distribution of the slipstream over the wings of an airplane in straight flight, Figure 2 is a diagrammatic sketch showing the shifting of the slipstream and the center of pressure to the left due to the angularity of the wind, Figure 3 is a diagrammatic showing of a simple mechanical form of the applicants' device for differential control of the angularity of the wing flaps, Figure 4 is a trigonometrical diagram showing the relationship of the displacement of the links to hingerod cranks to the angular position of the singletree arms, Figures 5 and 6 illustrate diagrammatically hydraulic and differential gear means for the control of the angularity of the wing flaps, and Figure 7 is a diagrammatic sketch which is illustrative of the relative magnitude of the wind velocity components which are normal to the leading edges of sweptback wings with a particular wind vector.

Referring to Figure 1, which is illustrative of an airplane in flaps down, straight flight, slipstream 10 from propeller 12 is shown flowing equally balanced over the wings. In this case the wind vector 11 is parallel to the "X" axis of the plane and the center of pressure 14 is located centrally on the "X" axis.

In Figure 2 the spanwise displacement of the slipstream due to the angularity of wind vector 16 with respect to the "X" axis is shown. Here the area of the right wing and flap in the flow of the slipstream is reduced by the area 18 and the area of the left wing and flap in the flow of the slipstream is increased by an area 20 and the center of pressure moves from the "X" axis to an eccentric point 22. This eccentricity of the center of pressure produces a rolling moment about the "X" axis and the airplane yaws (to the right as here shown). This rolling moment has a sense opposite to and opposes the rolling moment due to dihedral.

The increase in lift of the trailing wing produced by the spanwise diversion of the slipstream has associated with it an increase in the flap aerodynamic hinge moment. Similarly, on the leading wing there is produced a decrease in the flap aerodynamic hinge moment.

Since the applied hinge moment at each flap, being applied from a constant total torque through a differential, is constant, the trailing wing flap tends to rise and the leading wing flap tends to fall. As the trailing wing flap rises its aerodynamic hinge moment decreases and at some deflection equilibrium will again be attained. Similarly, the trailing wing flap will move downward to some equilibrium deflection.

The net result of this is a differential flap deflection with the trailing wing flap somewhat up from its original position and the leading wing flap somewhat down from its original position. The aileron effect of this differential flap deflection produces a rolling moment which tends to compensate the rolling moment due to slipstream diversion. Consideration of the distribution of the air forces indicate that the compensation is substantially complete; that refinements, such as differential movement of the flaps upwardly at a higher rate than the downward movement thereof enables the quick establishment of equilibrium therebetween and prevents overcompensation.

Referring to Figure 3 of the drawings, here is shown a simple embodiment of the applicants' invention. The wings 30, 32 of an airplane are provided with flaps 34, 36 respectively. These flaps are fixedly attached to hinge rods 38, 40 which in turn are rotatably attached to wings 30, 32. Rods 38, 40 are provided with cranks 42, 44 which are fixedly attached thereto. Obviously, rotation of cranks 42, 44 rotates flaps 34, 36 with respect to wings 30, 32. Cranks 42, 44 are connected to singletree 50 by means of push rods 46, 48. These push rods are pivotally connected both to cranks 42, 44 and to the extremities of singletree 50. The two legs of singletree 50 are inclined with respect to each other at an angle less than 180°. Singletree 50 is pivotally connected to push rod 54 which may extend into the cockpit of the airplane for pilot operation.

The operation of this device is in the following manner. The pilot sets both flaps at a desired angle for flaps down flight by means of push rod or actuator 54, which extends into the airplane cockpit. Thereafter movement of the flaps with respect to each other is automatic and differential, i. e. an upward movement of one flap produces a downward movement of the other flap but not at the same rate or to the same degree. The upward movement of a flap causes singletree 50 to rotate about its pivot on pushrod 54 and to rotate the other flap downwardly. If the singletree is straight, viz., if the two legs thereof are at 180° with respect to each other, the ratio of the deflection of the upgoing flap to the downgoing flap is 1:1. By making the angle between the legs a particular angle less than 180° the ratio of rate of deflection of the upgoing flap to that of the downgoing flap may be set at a value such as a maximum of about 1.25 to 1. The relative magnitudes of the two deflections are also in the same ratio as the rates. These trigonometrical relationships are disclosed in Figure 4 of the drawings wherein it is apparent that the displacement of either pushrod connected to the flaps is proportional to the sine of 90° minus the angle which the singletree leg makes with the continuation of the control pushrod. That is to say that the rate of displacement of either flap pushrod varies from 0 to 1 as the singletree leg swings from the position of maximum displacement to a position at right angles to control pushrod 54. Simultaneously the other leg of the singletree displaces the other flap pushrod in the opposite direction at a rate which varies from 1 to 0 as this singletree leg moves from a position at right angles to control pushrod 54 to coincidence therewith at the position of maximum displacement. The magnitude of the angular displacement of the flaps is proportional to the rates of displacement.

Figures 5 and 6 in the drawings are illustrative of mechanical means equivalent to the pivoted singletree device illustrated in Figure 3. In Fig. 5 the push rod 54 moves a piston 56 within a master cylinder 57, thus applying pressure to hydraulic fluid contained within branched tubing 58 connecting flap cylinders 60 and 61. Each of these flap cylinders contains fluid operated pistons (not shown) connecting piston rods 62 and 63 for pivotal connection to the lever arms 64 and 65 of flaps 34 and 36, respectively. On rearward movement of the master cylinder piston 56, pressure is transmitted through the branch conduit fluid to the flap cylinders 60 and 61 thereby moving piston rods 62 and 63, simultaneously, to lower flaps 34 and 36. A reverse movement of push rod 54 moves the flaps upwardly. Should at any time the air pressures on the flaps vary from each other, the flaps would tend to move to different extents and this relative movement would be accommodated by the fluid line and flap pistons, independently of the major tank pressure. In this way a lowering of one flap is balanced by a raising of the other flap.

In the arrangement of Fig. 6 a gear unit 70 is interposed between a rotatable main rod 69 and the flaps 34 and 36. As shown, the main rod terminates in a bevel gear 71, which meshes with a second bevel gear 72 mounted for free rotation on hinge rod 73 of flap 34. A casing 74 is attached rigidly to one side of gear 72, concentrically thereof, the casing wall opposite the gear being apertured to form a free bearing 75 on the hinge rod 76 of flap 36. This casing forms a housing for a set of differential bevel gears, 77, 78, 79 and 80, gears 77 and 79 terminating hinge rods 73 and 76 respectively and gears 78 and 80 being connected idler gears rotatable on stub shafts fixed to opposite casing walls.

In operation, rotation of the main rod 69 rotates bevel gear 71 and meshed gear 72 with its attached casing 74. If the pressure on the flaps be equal the torques applied to shafts 73 and 76 are equal and there is no relative rotation of gears 77 and 79. Hence the gear system will function as a rigid unit thereby deflecting flaps 34 and 36 equally. Should, however, the air force on the flaps become unequal, equilibrium will be attained by differential motion of gears 77 and 79 through idler gears 78 and 80, on one flap moving up and the other down.

It should be noted that with both the hydraulic system and the differential gear arrangement the relative movement of the flaps is in the ratio of 1:1 a condition which obtains in the singletree device when the legs of the singletree are at an angle of 180° to each other.

It is known that airplanes having highly sweptback wings are subject to an excessive positive dihedral when the flaps are deflected. This large positive dihedral effect coupled with the fact that the aileron power is reduced considerably on these wings at high lift coefficients, introduces a serious problem in their stability and control.

These inventors have found that the magnitude of this excessive positive dihedral effect may be overcome by linking the flaps differentially as described above. The operative effect of this type of linkage is due to the fact that when a sweptback wing sideslips the effective velocity component normal to the leading edge is increased on the leading wing; while this velocity component is reduced on the trailing wing. This condition is illustrated in Fig. 7 of the drawings. The relative magnitudes of the velocity components $V_R$ and $V_L$ which are respectively normal to the leading edges of the right and left wings is readily apparent. In this diagrammatic sketch:

$V_0$ represents the wind velocity
$V_R$ effective velocity component normal to leading edge of the right wing
$V_L$ effective velocity component normal to leading edge of the left wing
$\beta$ sideslip angle
$\lambda$ sweepback angle From the trigonometrical construction herein shown $$V_R = V_0 \cos(\beta - \lambda)$$

and $$V_L = V_0 \cos(\lambda + \beta)$$

The resulting increase in lift over the leading wing is accompanied by an increase in the flap hinge moment on this wing; while the hinge moment on the flap mounted on the trailing wing is reduced when the wing is sideslipping. By employing a differential linkage connection between the flaps as illustrated in Figure 3 the increased hinge moment on the leading wing flap causes it to deflect upwards which in turn causes the trailing wing flap to deflect downwards. Thus a rolling moment is set up in the direction to reduce the positive dihedral effect.

The inventors have found that by the application of the principle of their invention a satisfactory dihedral effect with sweptforward wings may be obtained. With sweptforward wings although the effect of the ailerons is much greater than in the case of sweptback wings, greater even than with normally positioned ailerons, the dihedral effect is negative. Positive dihedral effect can be obtained by employing the differential flap system of this invention for the reason that when the sweptforward wing is in sideslip, the trailing wing has a greater lift than the leading wing; the trailing wing flap is deflected upwards while the leading-wing flap is deflected downwards, thereby producing a positive dihedral effect. Furthermore, in the sweptforward wing, the operation of the flap differential system increases the static directional stability.

The principle of the applicants' invention is also applicable for increasing the lateral control and compensating for the loss in lateral control due to induced angles at the tail resulting from aileron deflections. In the case of supersonic missiles it has been found that because of the relatively large horizontal tails which are used on this type of missile, the application of aileron controls has resulted in large losses in lateral control; that these losses occur because the aileron deflections induce angles of attack at the tail which result in rolling moments which oppose those originally produced by the ailerons. With relatively large horizontal tails, these opposition rolling moments may become appreciable.

If one considers the right half wing for which the aileron is deflected downward, such deflection induces a downwash angle at the right half-tail. If the right half-elevator were separate and unrestrained and had a with-the-wind floating tendency, it would float downward. A similar consideration for the left half-wing for which the aileron is deflected upward, will indicate that the corresponding left half-elevator would float upward.

By employing the differential linkage of this invention between these tail elevators these floating tendencies can be employed to alleviate the opposing rolling moments induced at the tail when the wing ailerons are deflected.

In all of the described structures it is pointed out that the connections between the flaps are direct and free of any restraint to immediate and automatic differential adjustment for any inequality in the air forces on the two flaps.

While the applicants have described particular embodiments of differentially connected wing flaps devices for improving stability and control characteristics of airplanes they do not desire to be strictly limited thereto since one skilled in the art could make structural changes in the particular differentially acting flap connecting means without departing from the principle of operation of the device as shown. Such changes are included within the scope of the invention to the extent as defined by the herewith appended claims.

The invention described herein may be manufactured and used by or for the Government of the United States of America for governmental purposes without the payment of any royalties thereon or therefor.

What is claimed is:

1. An automatically operating flap control device for improving stability and control characteristics of aircraft in flight, said device comprising wings on opposite sides of the craft mass center, flaps on the trailing edge of said wings, hingerods mounted on said wings and secured to said flaps for pivotal movement thereof, connecting means of fixed length between said flap hingerods for transmitting movement of one flap to the other, said connecting means consisting of a central element and a single power transmitting element connected between said central element and each of said flap hingerods, and a movable actuator secured to said aircraft and adapted for placement in a fixed position, said actuator being attached to the central element of said connecting means for moving said flaps simultaneously to a desired deflecting position, said central element having connection only to said power transmitting elements and said actuator.

2. A flap control apparatus for aircraft, comprising wings on opposite sides of the craft mass center, flaps pivotally attached to the trailing edges of said wings for upward and downward deflection thereof, crank arms fixed to each of said flaps, an actuator mounted on said aircraft for moving said flaps simultaneously to a predetermined angle of deflection, a singletree pivotally secured to said actuator, and link means pivotally connecting the ends of said singletree to separate crank arms on said flaps, said singletree having connections only to said actuator and link means.

3. A flap control apparatus for aircraft, comprising wings on opposite sides of the craft mass center, flaps pivotally attached to the trailing edges of said wings, crank arms fixed to each of said flaps on the top side of said wings, an actuator for setting the flaps at a predetermined angle of deflection, a singletree pivotally mounted at its mid-point on said actuator, the arms of said singletree being inclined to each other at an angle less than 180° and rearwardly of its pivot, and link means pivotally connecting each of the exterior ends of said singletree arms to one of said crank arms, whereby operation of said actuator produces an equal deflection of both flaps, and an upward deflection of one flap produces a lesser downward deflection of the other flap, without movement of said actuator.

4. A flap control apparatus for aircraft comprising wings on opposite sides of the craft mass center, flaps pivotally attached to the trailing edges of said wings, crank arms fixed to each of said flaps, an actuator adapted for placement on said aircraft in a fixed position, connecting means between each of said flap crank arms and said actuator for moving said flaps simultaneously to a deflecting position, said connecting means including pivot-lever mechanism comprising a rigid cross bar pivotally connected to an element of said actuator, and links pivotally connecting each of the ends of said cross bar to one of said crank arms, whereby simultaneous opposed flap movement may take place without disturbance of the fixed position of said actuator, said cross bar having connections only to said links and actuator.

5. A flap control apparatus for aircraft comprising wings on opposite sides of the craft mass center, flaps pivotally attached to the trailing edges of said wings, crank arms fixed to each of said flaps, and differential means connecting said crank arms whereby an upward deflection of one flap produces a downward deflection of the other flap without disturbance of mechanism external to said differential flap connections, said differential means including a support mounted on said craft, a non-rectilinear singletree pivotally mounted intermediate its ends on said support, and connectors between the arms of said singletree and said crank arms, the angle formed by the singletree support pivot, one of the singletree arm pivots and the connector at said one arm pivot normally increasing with down movement of the flap attached to said connector and one arm pivot.

References Cited in the file of this patent

UNITED STATES PATENTS

| Number | Name | Date |
| --- | --- | --- |
| 1,806,379 | Wood | May 19, 1931 |
| 1,830,429 | Elsby | Nov. 3, 1931 |
| 1,869,326 | Ludlow | July 26, 1932 |
| 2,172,289 | Munk | Sept. 5, 1939 |
| 2,181,258 | Ayer | Nov. 28, 1939 |
| 2,417,189 | Cornelius | Mar. 11, 1947 |
| 2,478,033 | Weick | Aug. 2, 1949 |
| 2,523,579 | Lloyd | Sept. 26, 1950 |
| 2,573,044 | Morris | Oct. 30, 1951 |
| 2,609,165 | Hill | Sept. 2, 1952 |